(12) United States Patent
Pelosi, Jr.

(10) Patent No.: US 6,854,241 B1
(45) Date of Patent: Feb. 15, 2005

(54) DIMENSIONALLY STABLE ADHESIVE FLOOR COVERING SYSTEM

(76) Inventor: Frank Pelosi, Jr., 625 E. Chapel Ave., Cherry Hill, NJ (US) 08034

( * ) Notice: Subject to any disclaimer, the term of this patent is extended or adjusted under 35 U.S.C. 154(b) by 505 days.

(21) Appl. No.: 09/395,270

(22) Filed: Sep. 13, 1999

(51) Int. Cl.$^7$ .............................................. E04B 1/00
(52) U.S. Cl. .................................................. 52/746.1
(58) Field of Search ...................... 52/746.1; 428/40.1

(56) References Cited

U.S. PATENT DOCUMENTS

| | | |
|---|---|---|
| 3,589,956 A | 6/1971 | Kranz et al. |
| 4,234,649 A | 11/1980 | Ward |
| 4,405,668 A | 9/1983 | Wald |
| 4,647,484 A | 3/1987 | Higgins |
| 4,711,681 A | 12/1987 | Grossmann et al. |
| 4,751,130 A | 6/1988 | Grossmann et al. |
| 4,849,267 A | 7/1989 | Ward et al. |
| 5,116,439 A | 5/1992 | Raus |
| 5,120,587 A | 6/1992 | McDermott, III et al. |
| 5,304,268 A | 4/1994 | Hoopengardner |
| 5,601,910 A * | 2/1997 | Murphy et al. |
| 5,763,040 A | 6/1998 | Murphy et al. |
| 5,902,658 A * | 5/1999 | Wyman ...................... 428/40.1 |
| 6,012,261 A * | 1/2000 | McDonald .................. 52/746.1 |
| 6,013,342 A * | 1/2000 | Neto .......................... 52/40.1 |

OTHER PUBLICATIONS

Siga Products—Installation Instructions.
Collins & Aikman Floorcoverings—Technical Services, Nov. 8, 1997.
Shaw—Technical Bulletin #78–12/95.
Shaw—Technical Bulletin #82–12/95.
Shaw—Technical Bulletin #83–12/95.

* cited by examiner

*Primary Examiner*—Blair M. Johnson
(74) *Attorney, Agent, or Firm*—Norman E. Lehrer

(57) ABSTRACT

A system for installing carpet including a sheet which essentially includes a non-woven or flexible plastic backing with adhesive on both the top and bottom sides of the backing is disclosed. Release paper is placed on the adhesive on at least one side of the backing. When the carpet is ready to be installed the release paper from the side of the backing is removed so that the backing may be applied to a subfloor which may be a floor or pre-existing carpet. A carpet tile or carpet is placed on the top side of the backing. Thus, the present system provides dimensional stability to carpet tiles or carpet and to the existing floor.

16 Claims, 2 Drawing Sheets

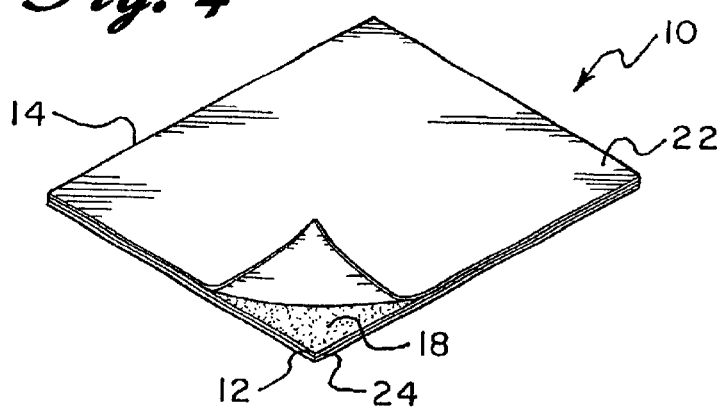
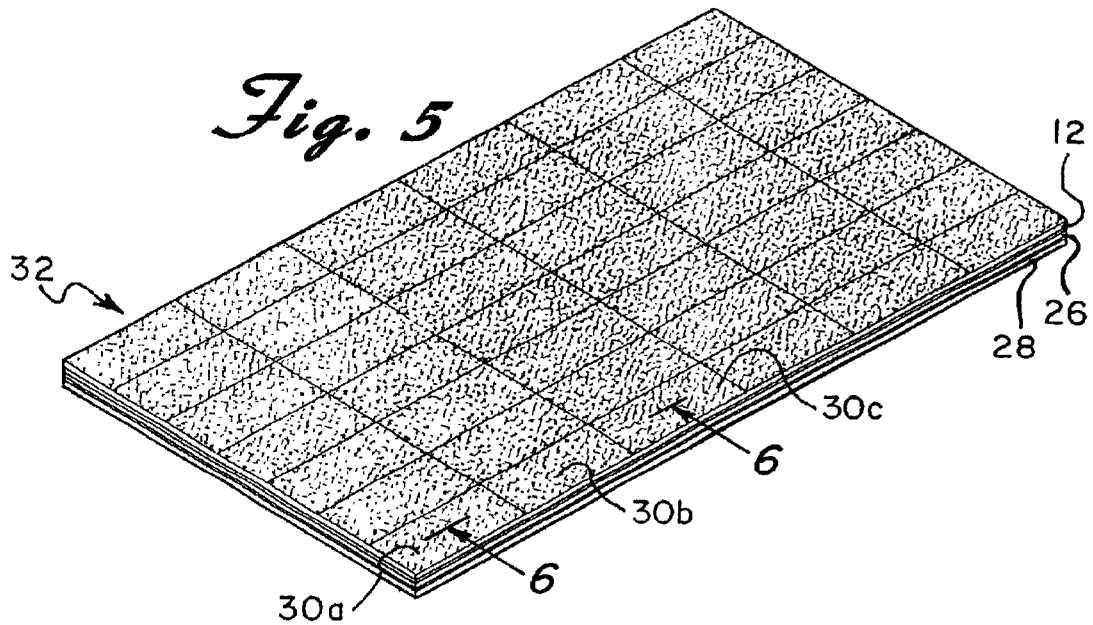
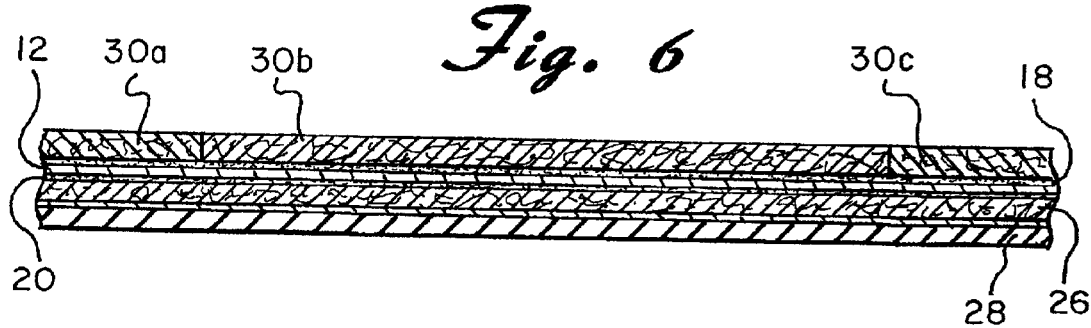

DIMENSIONALLY STABLE ADHESIVE FLOOR COVERING SYSTEM

BACKGROUND OF THE INVENTION

The present invention is directed toward a system for installing a floor covering, such as a carpet, on a preexisting carpet or floor and more particularly, toward a system which includes a sheet which prevents the floor covering from moving when the covering is installed.

Generally speaking, laying broadloam is often a difficult process, mainly because the carpet itself is not completely dimensionally stable. That is, when one walks across broadloam carpet that has been installed, it can shift in lateral directions or stretch. One method for laying broadloam carpet on a floor is by first applying an adhesive to the floor which bonds the carpet to the floor, thereby improving the stability. Another method involves an adhesive carrier which looks like a large, flexible screen and has pressure sensitive adhesive on both sides. The screen is adhered to the floor and the carpet is then unrolled directly on top of the screen. However, this procedure does not add any stability and requires special procedures to keep the carpet from moving or stretching.

Using carpet tiles is also another method for installing broadloam carpet but is undesirable. That is, because broadloam carpet is itself dimensionally unstable, one cannot create carpet tiles by simply cutting broadloam since the tiles would also become dimensionally unstable. Therefore, carpet tiles must be specially made. This is done by applying dimensionally stable backing materials to the back of the broadloam carpet and then cutting the carpet into large squares. This, however, is an expensive procedure.

Existing systems for installing broadloom carpet or carpet tiles over existing carpet rely on aggressive hot melt seaming tape or aggressive pressure sensitive seaming tapes to join pieces, to stop growth in traffic lanes, to stop shifting of carpet, and to stop deterioration of the edges; all of which occurs from the inability of the tape to eliminate stretch and flex at the edges of the carpet. Additionally, existing tapes will grow and stretch when subject to heavy rolling traffic. The hot melt tape physically bonds the top carpet to the carpet underneath. This eliminates the seam problem; however, it can cause lumps and is impractical if the carpet is to be cut into small pieces.

U.S. Pat. No. 5,763,040 to Murphy et al. discloses a carpet underlay comprising a fibrous, non-woven fabric and having an adhesive applied to one or both sides of the underlay. The underlay is applied to the underside of a carpet and the carpet is then laid on a floor. This patent discloses that the underlay is first adhered to the carpet, however, this underlay does not add or improve the dimensional stability of the products involved.

SUMMARY OF THE INVENTION

The present invention is designed to overcome the deficiencies of the prior art discussed above. It is an object of this invention to provide a system for installing a floor covering on a floor or pre-existing carpet.

It is another object of the present invention to provide dimensional stability to carpet tiles.

It is a further object of the present invention to provide dimensional stability to broadloom carpet.

In accordance with the illustrative embodiments demonstrating features and advantages of the present invention, there is provided a system for installing carpet including a sheet which essentially includes a non-woven backing with adhesive on both the top and bottom sides of the backing. Release paper is placed on the adhesive on a side of the backing. When the carpet is ready to be installed the release paper from the bottom side of the backing is removed so that the bottom side of the backing may be applied to a pre-existing floor or carpet. A carpet tile or carpet may then be placed on the top side of the backing. Alternatively, the sheet may be a thin, flexible plastic material with adhesive on both the top and bottom sides.

Other objects, features, and advantages of the invention will be readily apparent from the following detailed description of a preferred embodiment thereof taken in conjunction with the drawings.

BRIEF DESCRIPTION OF THE DRAWINGS

For the purpose of illustrating the invention, there is shown in the accompanying drawings one form which is presently preferred; it being understood that the invention is not intended to be limited to the precise arrangements and instrumentalities shown.

FIG. 4 is a top perspective view of the sheet of the present invention;

FIG. 5 is perspective view of a carpet having carpet files placed thereon; and

FIG. 6 is a cross-sectional view of the carpet having carpet tiles placed thereon taken through the line 6—6 of FIG. 5.

DETAILED DESCRIPTION OF THE PREFERRED EMBODIMENT

Figure 1:
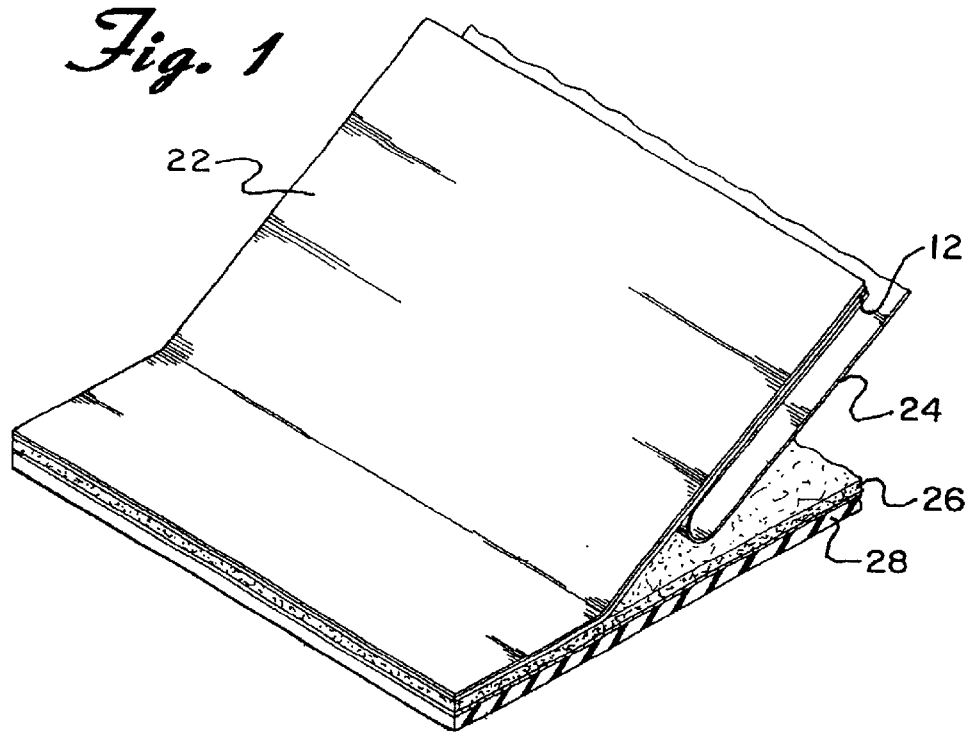
FIG. 1 is a top perspective view of the sheet of the present invention being placed on a pre-existing carpet.
Figure 2:
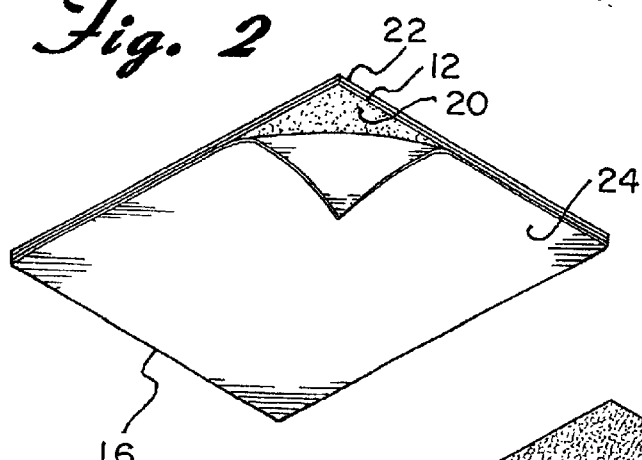
FIG. 2 is a bottom perspective view of the sheet of the present invention.
Figure 3:
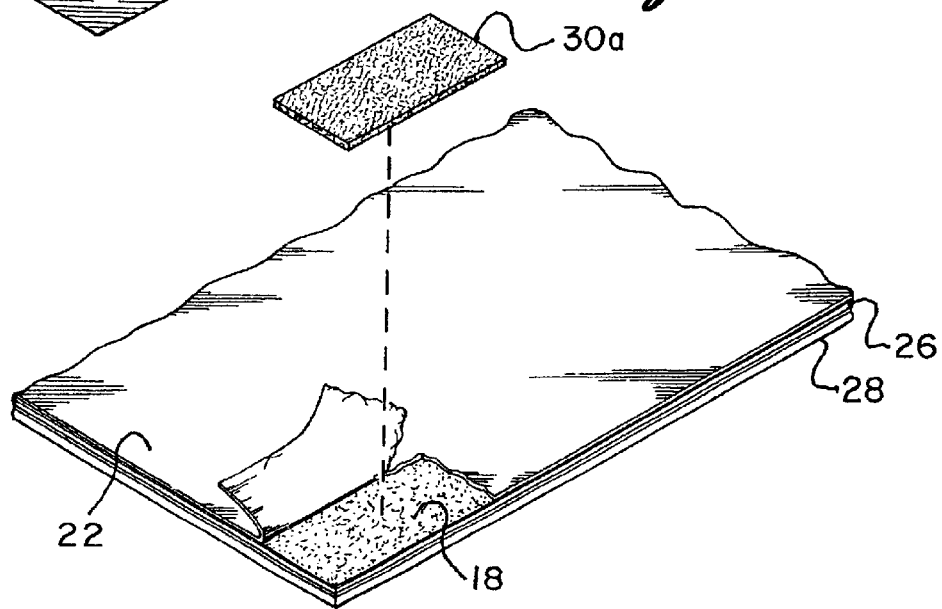
In FIG. 3 is an exploded view showing the placement of a carpet tile on the sheet of the present invention.

Referring now to the drawings in detail wherein like reference numerals have been used throughout the various figures to designate like elements, there is shown in FIG. 4 a dimensionally stable sheet constructed in accordance with the principles of the present invention and designated generally as 10.

The dimensionally stable sheet of the present invention essentially includes a flexible backing 12 with a top side 14 and a bottom side 16. An adhesive 18 may be applied to the top side 14 and an adhesive 20 may be applied to the bottom side 16 of the backing 12. Alternatively, an adhesive may be applied to only one side of the backing. Release paper 22 is placed on the adhesive 18 of the top side 14 and release paper 24 is placed on the adhesive 20 of the bottom side 16 of the backing 12. The release paper 22 and 24 may be waxed and is of the type typically known and used in the art.

The adhesive is preferably a pressure sensitive adhesive, however, other adhesives well known in the art may be used. Also, the adhesive applied to the top side 14 of the backing 12 may be different from the adhesive applied to the bottom side 16 of the backing 12. The adhesive may be compatible with vinyl, which is often secured to the back of carpet, in order to avoid plasticizer migration. For example, the adhesive may be a non-oxidizing pressure sensitive adhesive comprising a permanently tacky modified acrylic vinyl acetate-ethelyne copolymer material. The adhesive may also be a synthetic rubber pressure sensitive adhesive.

The backing 12 is a fibrous and non-woven material. It is generally not in a grid pattern. The backing 12 may be made from a non-woven plastic film such as the non-woven, spun-bonded polyethylene film sold under the trade name Tyvek and manufactured by E. I. du Pont de Nemours and Company, Wilmington, Del. The backing may also be made from Typar which is a spun-bonded, non-woven fabric of polypropylene composed of randomly arranged, continuous filament fibers bonded at filament cross-over points available from Norville Industrials, Dalton, Ga. Alternatively, the backing may be made from a thin, flexible but dimensionally stable plastic material, such as Mylar. Preferably, when the backing is made from Tyvek, Typar, or similar material, the backing has a thickness of less than 10 mils and more preferably, less than 6 mils so that the same functions solely as a dimensional stabilizer rather than functioning to add additional padding or the like. When the backing is made from Mylar or similar material, the backing has a thickness of approximately 1–2 mils, and preferably, approximately 1 mil.

In order to use the sheet 10 of the present invention, the release paper 24 from the bottom side 16 of the backing 12 is removed. The bottom side 16 of the backing 12 is then placed on an existing carpet or cushion 26 or any subfloor, such as a concrete floor. (If the sheet is being placed on preexisting carpet 26, a foam back 28 may exist below the carpet 26.) The release paper 22 on the top side 14 of the backing 12 is removed as carpet tiles 30a, 30b, and 30c, for example, are placed on the adhesive 18 of the top side 14 of the backing 10. The result is a floor 32 having a pre existing carpet 26 covered with carpet tiles as seen in FIG. 5. In this manner, the pre-existing carpet 26 becomes dimensionally stable and is impervious to movement which takes place on the carpet tiles. Thus, with the present system it is possible to install cut pieces, or tiles, of broadloam carpet over flexible subfloors such as existing carpet or cushion. It is also possible to install large sheets of broadloom carpet, instead of carpet tiles, on a subfloor.

The sheet of the present invention may be cut into any desired length and width and may be rolled for ease in transportation and placement so that the same may be unrolled as needed or used. When the sheet is rolled, only one side of the sheet needs to be covered with release paper.

The present invention may be embodied in other specific forms without departing from the spirit or essential attributes thereof and accordingly, reference should be made to the appended claims rather than to the foregoing specification as indicating the scope of the invention.

I claim:

1. A method of applying a carpet to a subfloor comprising the steps of:

providing a dimensionally stable sheet having a backing with a top side and a bottom side, said backing being made from a spun-bonded, non-woven fabric having a thickness of approximately 8 mils and having adhesive applied to at least one of said top or bottom sides;

placing said sheet on an existing subfloor;

providing a carpet; and placing said carpet on said sheet.

2. The method of applying a carpet to a subfloor claimed in claim 1 wherein said adhesive is applied to both top and bottom sides of said backing.

3. The method of applying a carpet to a subfloor claimed in claim 2 further including the step of placing release paper on at least one of said top or bottom sides of said backing.

4. The method of applying a carpet to a subfloor claimed in claim 3 further including the step of removing said release paper from said backing.

5. The method of applying a carpet to a subfloor claimed in claim 2 wherein the adhesive applied to said top side of said backing is different from the adhesive applied to said bottom side of said backing.

6. The method of applying a carpet to a subfloor claimed in claim 1 wherein said carpet is a carpet tile.

7. The method of applying a carpet to a subfloor claimed in claim 1 wherein said subfloor is an existing carpet.

8. The method of applying a carpet to a subfloor claimed in claim 1 wherein said subfloor is a concrete floor.

9. A method of applying a carpet to a subfloor comprising the steps of:

providing a dimensionally stable sheet having a backing with a top side and a bottom side, said backing being made tom a thin flexible plastic material having a thickness of approximately 1 mil to approximately 2 mils and having adhesive applied to at least one of said top or bottom sides;

placing said sheet on an existing subfloor;

providing a carpet; and placing said carpet on said sheet.

10. The method of applying a carpet to a subfloor claimed in claim 9 wherein said adhesive is applied to both top and bottom sides of said backing.

11. The method of applying a carpet to a subfloor claimed in claim 10 further including the step of placing release paper on at least one of said top or bottom sides of said backing.

12. The method of applying a carpet to a subfloor claimed in claim 11 further including the step of removing said release paper from said backing.

13. The method of applying a carpet to a subfloor claimed in claim 10 wherein the adhesive to said top side of said backing is different from the adhesive applied to said bottom side of the said backing.

14. The method of applying a carpet to a subfloor claimed in claim 9 wherein said carpet is a carpet tile.

15. The method of applying a carpet to a subfloor claimed in claim 9 wherein said subfloor is an existing carpet.

16. The method of applying a carpet to a subfloor claimed in claim 9 wherein said subfloor is a concrete floor.

* * * * *